(12) United States Patent
Silsby

(10) Patent No.: US 8,401,990 B2
(45) Date of Patent: Mar. 19, 2013

(54) SYSTEM AND METHOD FOR AGGREGATING RAW DATA INTO A STAR SCHEMA

(75) Inventor: Joseph M. Silsby, Kittery Point, MA (US)

(73) Assignee: CA, Inc., Islandia, NY (US)

( * ) Notice: Subject to any disclaimer, the term of this patent is extended or adjusted under 35 U.S.C. 154(b) by 358 days.

(21) Appl. No.: 12/180,372

(22) Filed: Jul. 25, 2008

(65) Prior Publication Data

US 2010/0023546 A1    Jan. 28, 2010

(51) Int. Cl.
  *G06F 7/00* (2006.01)
  *G06F 17/00* (2006.01)
(52) U.S. Cl. ...................................... 707/601
(58) Field of Classification Search .......... 707/601, 707/602, 999.102
  See application file for complete search history.

(56) References Cited

U.S. PATENT DOCUMENTS

| | | | |
|---|---|---|---|
| 6,161,103 A * | 12/2000 | Rauer et al. ................... | 1/1 |
| 6,212,524 B1 * | 4/2001 | Weissman et al. ............ | 707/600 |
| 6,335,935 B2 | 1/2002 | Kadambi et al. | |
| 6,487,603 B1 | 11/2002 | Schuster et al. | |
| 6,594,653 B2 | 7/2003 | Colby et al. | |
| 6,816,455 B2 | 11/2004 | Goldberg et al. | |
| 6,877,134 B1 | 4/2005 | Fuller et al. | |
| 6,895,471 B1 * | 5/2005 | Tse et al. ..................... | 711/118 |
| 7,007,029 B1 | 2/2006 | Chen | |
| 7,031,953 B2 | 4/2006 | Shah et al. | |
| 7,089,266 B2 | 8/2006 | Stolte et al. | |
| 7,116,719 B2 | 10/2006 | Hamery et al. | |
| 7,333,982 B2 | 2/2008 | Bakalash et al. | |
| 2001/0001159 A1 | 5/2001 | Ford | |
| 2002/0075852 A1 | 6/2002 | Preiss | |
| 2003/0135857 A1 | 7/2003 | Pendakur et al. | |
| 2004/0054683 A1 | 3/2004 | Nishizawa et al. | |
| 2004/0139061 A1 | 7/2004 | Colossi et al. | |
| 2004/0199517 A1 | 10/2004 | Casati et al. | |
| 2005/0165741 A1 | 7/2005 | Gordon | |
| 2005/0283488 A1 | 12/2005 | Colossi et al. | |
| 2006/0004814 A1 * | 1/2006 | Lawrence et al. ............. | 707/101 |
| 2006/0026302 A1 | 2/2006 | Bennett et al. | |
| 2006/0036637 A1 | 2/2006 | Sayal et al. | |
| 2006/0120283 A1 | 6/2006 | Poetker et al. | |
| 2006/0130118 A1 * | 6/2006 | Damm ......................... | 725/135 |

(Continued)

FOREIGN PATENT DOCUMENTS

| | | |
|---|---|---|
| EP | 823798 | 2/1998 |
| EP | 1517518 | 3/2005 |

(Continued)

OTHER PUBLICATIONS

B. David Bryan, "System and Method for Filtering and Alteration of Digital Data Packets," U.S. Appl. No. 12/180,348, 21 pages, Filed Jul. 25, 2008.

(Continued)

*Primary Examiner* — Aleksandr Kerzhner
(74) *Attorney, Agent, or Firm* — Baker Botts, L.L.P.

(57) ABSTRACT

A method for aggregating raw data into a star schema comprises receiving data from a data source. The data is aggregated into star schema objects, based on a user-defined metadata schema. The star schema objects are stored into a star schema database.

18 Claims, 2 Drawing Sheets

U.S. PATENT DOCUMENTS

| | | | |
|---|---|---|---|
| 2006/0165375 | A1 | 7/2006 | Choi et al. |
| 2006/0209829 | A1 | 9/2006 | Lo et al. |
| 2006/0259507 | A1 | 11/2006 | Higuchi |
| 2007/0027860 | A1 | 2/2007 | Bestgen et al. |
| 2007/0162472 | A1 | 7/2007 | Wan et al. |
| 2007/0223481 | A1 | 9/2007 | Sivakumar et al. |
| 2007/0233651 | A1 | 10/2007 | Deshpande et al. |
| 2007/0239769 | A1 | 10/2007 | Fazal et al. |
| 2008/0183710 | A1 | 7/2008 | Serjeantson et al. |
| 2008/0212597 | A1* | 9/2008 | Baryshnikov et al. ........ 370/408 |
| 2009/0030883 | A1 | 1/2009 | Das et al. |
| 2009/0199230 | A1 | 8/2009 | Kumar et al. |
| 2009/0234862 | A9 | 9/2009 | Begeja et al. |

FOREIGN PATENT DOCUMENTS

| | | |
|---|---|---|
| JP | 09284342 | 10/1997 |

OTHER PUBLICATIONS

Utley, C., "Designing the Star Schema Database," Version 1.1, http://ciobriefings.com/Publications/WhiePapers/DesiginingtheStarSchemaDatabase/tabid/..., (Talk given 1999), 16 pages, Jul. 17, 2008.

Li, J., et al., "A Formal Model for the Problem of View Selection for Aggregate Queries," Operations Research Program, NC State University, Raleigh, NC, http://dbgroup.ncsu.edu/rychirko/Papers/LiACF05.pdf, 14 pages, Sep. 21, 2005.

H. David Bryan, U.S. Appl. No. 12/180,348, Office Action from the U.S. Patent and Trademark Office dated Dec. 21, 2009.

H. David Bryan, U.S. Appl. No. 12/180,348, Office Action from the U.S. Patent and Trademark Office dated Jul. 2, 2010.

H. David Bryan, U.S. Appl. No. 12/180,348, Office Action from the U.S. Patent and Trademark Office dated Dec. 16, 2010.

H. David Bryan, U.S. Appl. No. 12/180,348, Response mailed Apr. 18, 2011 to non-final Office Action dated Dec. 16, 2010.

H. David Bryan, U.S. Appl. No. 12/180,348, final Office Action from U.S. Patent and Trademark Office dated Jul. 11, 2011.

H. David Bryan, U.S. Appl. No. 12/180,348, Response mailed Sep. 12, 2011 to final Office Action dated Jul. 11, 2011.

H. David Bryan, U.S. Appl. No. 12/180,348, Advisory Action from US Patent and Trademark Office dated Oct. 19, 2011.

H. David Bryan, U.S. Appl. No. 12/180,348, Notice of Appeal and Pre-Brief Conference Request mailed to the US Patent and Trademark Office on Nov. 21, 2011.

H. David Bryan, U.S. Appl. No. 12/180,348, Request for Continued Examination and Amendment mailed to the US Patent and Trademark Office on Feb. 15, 2012.

H. David Bryan, U.S. Appl. No. 12/180,348, Non-final Office Action from US Patent and Trademark Office dated Apr. 16, 2012.

H. David Bryan, U.S. Appl. No. 12/180,348, Response to Non-final Office Action mailed to the US Patent and Trademark Ofice on Jul. 16, 2012.

H. David Bryan, U.S. Appl. No. 12/180,348, Final Office Action from US Patent and Trademark Office dated Nov. 8, 2012.

* cited by examiner

SYSTEM AND METHOD FOR AGGREGATING RAW DATA INTO A STAR SCHEMA

RELATED APPLICATIONS

This application is being filed concurrently with co-pending patent application U.S. Ser. No. 12/180,348, entitled "System and Method for Filtering and Alteration of Digital Data Packets", which is incorporated by reference herein.

TECHNICAL FIELD

The present disclosure relates generally to data filtering, and more particularly to a system and method for aggregating raw data into a star schema.

BACKGROUND

Data processing generally refers to automated computer processes that convert data into information. Incoming data is often in a raw form, consisting of numbers or characters that may not be of much use to a user. Therefore, in many situations, data processing consists of manipulating the raw data into information that is well-presented and informative to a user. This information may allow for easier analysis and presentation of the resulting information to the user.

SUMMARY OF EXAMPLE EMBODIMENTS

The present disclosure is directed to a system and method for aggregating raw data into a star schema. The teachings of the present disclosure may allow the conversion of raw data into a star schema, allowing a user to generate reports from the data.

In accordance with a particular embodiment of the present disclosure, a method for aggregating raw data into a star schema comprises receiving data from a data source, aggregating the data into star schema objects, based on a user-defined metadata schema, and storing the star schema objects into a star schema database. More specifically, the star schema database may be generated in approximately real time using the user-defined metadata schema. According to particular embodiments, the star schema objects may comprise statistics relating to the data, and reports may be generated based on these statistics.

In accordance with another aspect of the present invention, a system comprises an interface that is operable to receive data from a data source and a processor that is operable to aggregate the data into star schema objects, based on a user-defined metadata schema. The system further comprises a star schema database operable to store the star schema objects.

In accordance with another aspect of the present invention, logic encoded in a computer readable medium is operable, when executed on a processor, to receive data from a data source, aggregate the data into star schema objects, based on a user-defined metadata schema, and store the star schema objects into a star schema database.

Technical advantages of particular embodiments of the present disclosure include a method for aggregating raw data into a star schema. This may allow a user to run tools against the star schema and generate meaningful reports from the aggregated data.

Further technical advantages of particular embodiments include a method for aggregating data using a user-defined metadata schema. This may allow the system to be scalable and customized by particular users.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Data processing is relied upon by many different computer applications to transform incoming raw data into useful information that can be communicated to a user. Data may often be received from multiple business systems in a form that is not easily analyzed by a user. In accordance with the teachings of the present disclosure, a system and method for aggregating raw data into a star schema is disclosed. An object of the present disclosure is to aggregate data into a format that allows the generation of reports for easier user analysis.

In accordance with the teachings of the present disclosure, a method for aggregating raw data into a star schema comprises receiving data from a data source and aggregating the data into star schema objects, based on a user-defined metadata schema. The method further comprises storing the star schema objects into a star schema database.

According to particular embodiments, the star schema database may be generated in approximately real time using the user-defined metadata schema. According to particular embodiments, the star schema objects may comprise statistics relating to the data, and reports may be generated based on these statistics.

Figure 1:
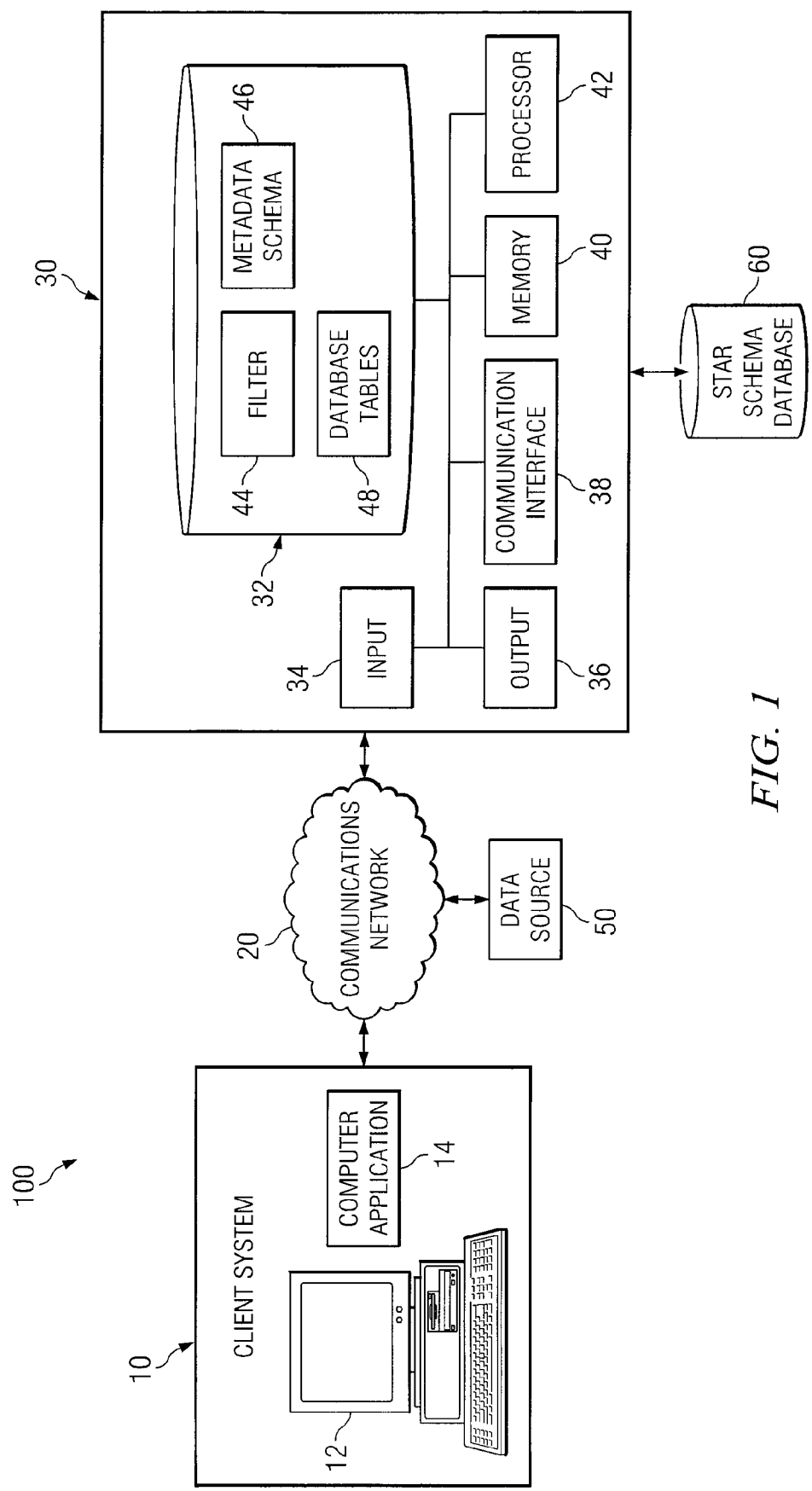
FIG. 1 is a schematic drawing illustrating a computer network configuration suitable for use within particular embodiments of the present invention.

FIG. 1 illustrates a communications system, generally designated by reference numeral 100. Communications system 100 includes client system 10, communications network 20, server 30, data source 50, and star schema database 60.

Client system 10 includes a computer terminal 12, or other medium for accomplishing electronic communication. Terminal 12 may also include specific software, including a browser 14 which allows standardized communication with network server 30. Although the illustrated embodiment depicts client system 10 as a separate element, in alternative embodiments client system 10 may reside locally on server 30.

Server 30 may refer to any device that is operable to deliver information that is sent to the client system 10. According to the illustrated embodiment, server 30 includes storage device 32, an input device 34, an output device 36, a communication interface 38, a memory device 40, and a processor 42.

Input device 34 may refer to any suitable device that is operable to input, select, and/or manipulate various data and information. Input device 34 may include, for example, a keyboard, mouse, graphics tablet, joystick, light pen, microphone, scanner, or other suitable input device.

Output device 36 may refer to any suitable device that is operable for displaying information to a user. Output device 36 may include, for example, a video display, a printer, a plotter, or other suitable output device.

Communication interface 38 may refer to any suitable device that is operable to receive input for server 30, send output from server 30, perform suitable processing of the input or output or both, communicate to other devices, or any combination of the preceding. Communication interface 38 may include appropriate hardware (e.g. modem, network interface card, etc.) and software, including protocol conversion and data processing capabilities, to communicate through a LAN, WAN, or other communication system that allows server 30 to communicate to other devices. Communication interface 38 may include one or more ports, conversion software, or both.

Memory device 40 may refer to any suitable device operable to store and facilitate retrieval of data, and may comprise random access memory (RAM), read only memory (ROM), a magnetic drive, a digital video disk (DVD) drive, removable media storage, any other suitable data storage medium, or a combination of any of the preceding.

Processor 42 may refer to any suitable device operable to execute instructions and manipulate data to perform operations for server 30. Processor 42 may include, for example, any type of central processing unit (CPU).

Storage device 32 may refer to any suitable device operable for storing data and instructions. Storage device 32 may include, for example, a magnetic disk, flash memory, optical disk, or other suitable data storage device. According to the illustrated embodiment, storage device 32 may comprise filter 44, metadata schema 46, and database tables 48.

Filter 44 may comprise any software, hardware, or combination thereof capable of filtering incoming data in accordance with the teachings of the present disclosure. Incoming data may comprise any format of data. According to particular embodiments, the data may comprise digital packets of data. According to the illustrated embodiment, filter 44 is stored within storage device 32. However, according to alternative embodiments, filter 44 may be located on client system 10 or elsewhere on the network.

In general, metadata refers to data about data. A schema may refer to the structure of a database system that is described in formal language supported by a database management system (DBMS). In particular embodiments, such as relational databases, the schema may define the tables, fields within the tables, and the relationships between fields and tables within the database. Accordingly, metadata schema 46 may refer to data describing the tables, fields, and relationships of a database, as well as data that describes the mapping from objects and their properties to the database tables and fields. According to particular embodiments, metadata schema 46 may be user-defined. According to the illustrated embodiment, metadata schema 46 is stored within storage device 32. However, according to alternative embodiments, metadata schema may be located on client system 10 or elsewhere on the network.

Database tables 48 may refer to one or more tables or databases that are capable of storing data. In particular, database tables 48 may store incoming data after it is filtered. Database tables 48 may be generated based on predetermined table names, field names, or other attributes. These values may be stored in user-defined metadata schema 46. According to particular embodiments, database tables 48 may be generated in approximately real time during the filtering process. Although database tables 48 are located in storage device 32 in the illustrated embodiment, they may also be located on client system 10 or elsewhere on the network.

Although filter 44, metadata schema 46, and database tables 48 are illustrated as distinct elements, in alternative embodiments, some or all of these elements may be integrated into a single element.

Star schema is a style of data warehouse schema consisting of fact tables that reference dimension tables. Star schema database 60 may refer to any database conforming to the star schema style. In particular embodiments, the star schema objects stored within star schema database 60 may comprise statistics. In the illustrated embodiment, star schema database 60 is positioned external to server 30. However, according to alternative embodiments, star schema database 60 may be located on client system 10, in storage device 32, or elsewhere on server 30. According to particular embodiments, star schema database 60 may be generated in approximately real time.

Data source 50 may refer to any source of incoming data that will be filtered according to the teachings of the present disclosure. Although data source 50 is illustrated as a distinct element, data for filtering may also reside locally on client system 10 or on server 30.

Figure 2:
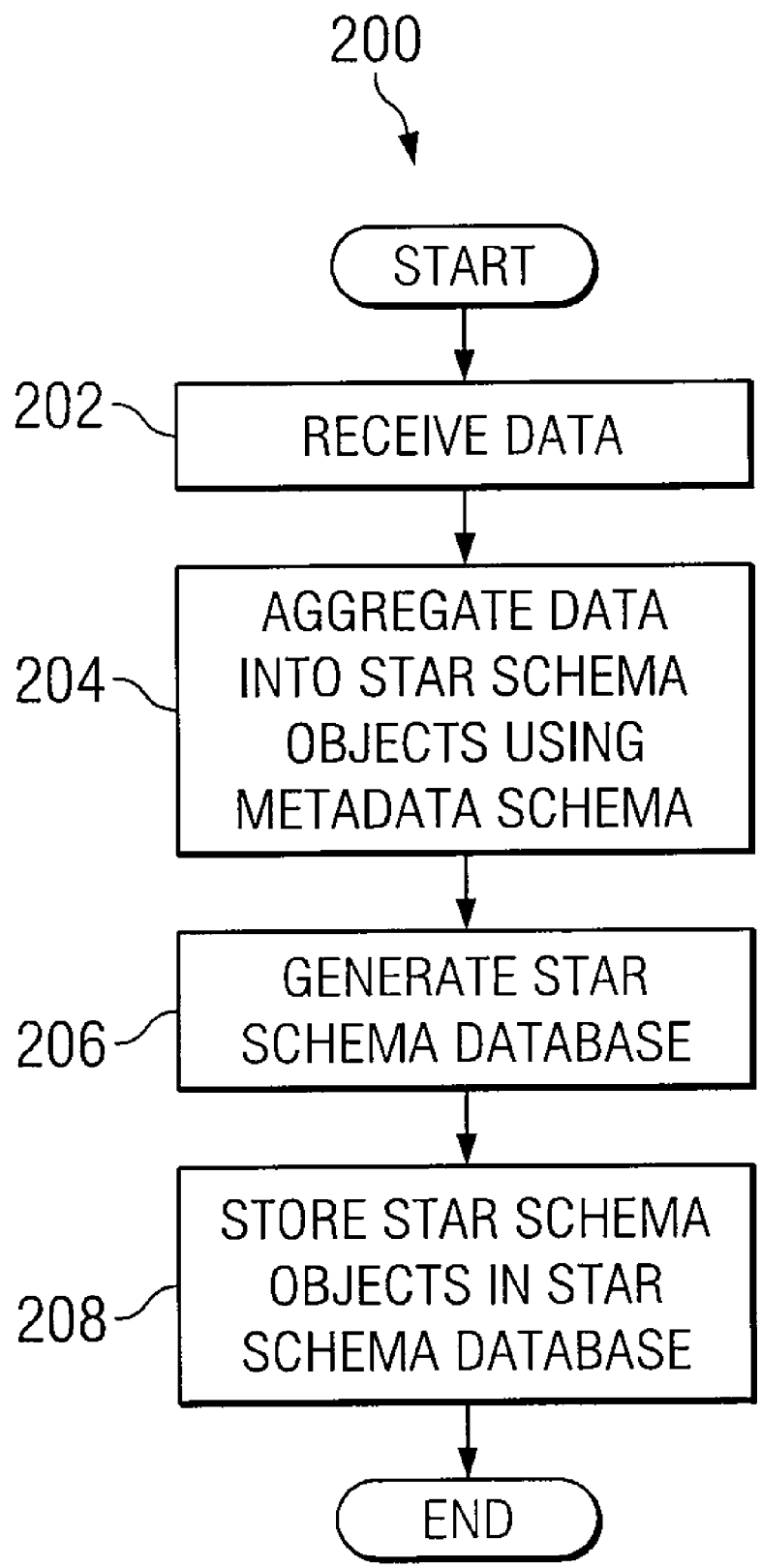
FIG. 2 is a flow diagram illustrating a method for aggregating raw data into a star schema, according to particular embodiments of the present disclosure.

FIG. 2 is a flow diagram illustrating a method for aggregating raw data into a star schema, according to particular embodiments of the present disclosure. The specific steps of FIG. 2 will be described in detail below with reference to elements illustrated in FIG. 1.

The process begins at step 202, where data is received. This data may be data in any format. According to particular embodiments, this data will be raw or unprocessed data. In many forms, such as binary, this data may not be particularly helpful or understandable by a user in its raw form. The type of data received may vary depending on the application being used. For example, when running a project management application, a user may receive data relating to rule events. This data may include, but is not limited to data regarding when rule processing began, when it completed, and what the process results were. In alternative embodiments, the incoming data may comprise any kind of event notification, with or without corresponding measurement data.

The data may also be received from one or more different sources. According to the illustrated embodiment, this data may come from data source 50, using communications network 20. Data source 50 may be any software, hardware, or combination thereof capable of storing and delivering raw data. Data may also be received from client system 10, server 30, or any other location on a network. According to the illustrated embodiment, this incoming data may be received at server 30. In particular embodiments, this data may be received using communication interface 38.

According to particular embodiments, the system of the present disclosure may aggregate this raw data as it is received from various business systems. However, according to alternative embodiments, this raw data may undergo a filtering process, reducing or modifying the data before it is aggregated. This may improve the system performance, reducing the response time for downstream processing and aggregation of the data.

This filtering process may begin by receiving the data in a raw form. This may mean that the system may be unable to understand or process the data in this form. Therefore, it may be desirable to convert the raw data to some form that can be understood for filtering by the system. According to particular embodiments, this may be accomplished by converting the raw data into digital data packets having a common format, as shown by step 204. This common format may be virtually any data format and may depend on the application being employed. For instance, if an application uses XML, the incoming data may be converted into XML packets. As used herein, "common" means that, although the incoming data may be in various different formats, it will all be converted into digital data packets that share a common format, such as XML.

XML, or Extensible Markup Language, is generally classified as an extensible language that allows users to define their own elements. One of the benefits of XML is that it may facilitate the sharing of structured data across various information systems. XML is commonly used in many data processing applications and may be considered user-friendly. Metadata schema 46 may define how the data is converted into XML packets. For instance, the metadata schema 46 may define dimensions, attributes, and measures corresponding to the data. After being converted, the system may be able to understand the XML data packets for purposes of filtering.

Furthermore, according to particular embodiments, the data may be converted into digital packets in approximately real time. As used in this disclosure, "real time" means that data is converted or filtered as it is received, with little or no buffering. The conversion of the raw data into digital packets may be accomplished using virtually any computer programming language. According to particular embodiments, Java may be used for this purpose.

After the raw data has been converted into digital packets, these packets may then be filtered. This filtering process may be accomplished using filter 44 and metadata schema 46.

As described earlier, metadata schema 46 may refer to data describing the tables, fields, and relationships of a database, as well as data that describes the mapping from objects and their properties to the database tables and fields. According to particular embodiments, metadata schema 46 may be generated at the same time that data is converted into commonly-formatted digital packets. According to alternative embodiments, metadata schema may be created before data is received. Metadata schema 46 may be user-defined. This may allow the user to define the types of information that the user does and does not wish to receive. Metadata schema may also consist of predetermined definitions without any user input. Alternatively, a combination of user-selected and predetermined definitions may be incorporated into metadata schema 46.

In the illustrated embodiment, metadata schema 46 may be stored within storage device 32. In this way, the metadata schema 46 may be made available to multiple users connected to server 30. Alternatively, a single metadata schema 46 may be used for only one user or computer system 12. In these particular embodiments, metadata schema may be located in storage device 32, as pictured, or may alternatively be located on client system 10, for instance in computer system 12.

In particular embodiments, the filtering carried out by filter 44 may comprise simple threshold filtering. This could mean that each packet for filtering will be measured against a threshold value to see if the packet is less than, greater than, or equal to that predefined threshold. The threshold value may be stored in metadata schema 46. In particular embodiments, this value may be defined by a user. In particular embodiments, the filtering carried out by filter 44 may also be more sophisticated than threshold filtering.

In the illustrated embodiment, filter 44 is pictured as a single element. However, in particular embodiments, filter 44 may actually comprise a plurality of different filters. This may allow more data to be filtered at one time, allowing the system to maintain approximately real time filtering. Additionally, multiple different filters may also be processed sequentially on a given piece of data. This may allow for more sophisticated filtering of the data than would be possible using a single filter.

The data may then be filtered using criteria defined in metadata schema 46. As described above, if threshold filtering is employed, this may comprise comparing the data against a threshold value defined in metadata schema 46. If the data does not satisfy criteria in metadata schema 46, that data packet may be deleted. The type of data that may be deleted during the filtering process will depend on the metadata schema. For instance, the metadata schema may be structured such that repetitive data is deleted. Additionally, a user may define the types of data he or she wishes to receive, and data not matching these types may be deleted. Alternatively, data that does not meet certain criteria defined in metadata schema 46 may not always be deleted. In particular embodiments, this data may simply be passed on for storage without processing. For instance, this data may be stored in database tables 48. In particular embodiments, a separate database or other storage device may be employed for this data that will not be processed.

However, if the data packet does meet the criteria defined in metadata schema 46, it may be passed on for aggregation at step 204. Alternatively, the filtered data may be passed to a data storage medium, such as database tables 48, where it may be retrieved for later aggregation. In alternative embodiments, the filtered data may be stored on client system 10 or elsewhere on the network. From this point, the filtered data may be available for various data processing, such as aggregation.

In particular embodiments, the filtering process according to the present disclosure may simply involve either deleting a packet or storing the packet in a data storage medium. However, in alternative embodiments, additional steps may be included in the filtering process. The inclusion or exclusion of these steps may depend on the criteria defined in metadata schema 46.

For instance, in particular embodiments, filtering may include modifying data before it is sent for storage or aggregation. This may allow the incoming data to be changed in approximately real time before it is sent on for aggregation. According to particular embodiments where the data packets comprise XML packets, when a change is made to the data, the change is actually made to the XML data packet, and not the incoming raw data. In particular embodiments, this modification would normally be performed during the later data processing. By modifying the data before it is aggregated, this may reduce or even eliminate the need for downstream modification, which may free up resources for more advanced downstream processing. In specific embodiments, data modification may take the form of table replacement. This allows the incoming data to be replaced with data already existing in a database table, such as tables 48.

Regardless of whether the raw data is filtered or not, the data may then be aggregated into star schema objects according to step 204. This aggregation process may rely on metadata schema 46.

Aggregation refers generally to any process in which data is gathered and expressed in summary form. This process may often be used for statistical analysis. In particular embodiments involving computer applications, aggregation may be used to gather data in a raw or abstract form and express it in some manner that is useful or understandable by a user. According to particular embodiments of the present disclosure, this comprises aggregating data into star schema objects.

As discussed above, star schema is a style of data warehouse schema consisting of fact tables that reference dimension tables. Star schema objects may be objects stored within star schema database 60. In particular embodiments, the star schema objects stored within star schema database 60 may comprise statistics relating to the data. These statistics may include, but are not limited to minimum, maximum, average, sum, and standard deviation.

According to particular embodiments, the star schema objects may be defined by metadata schema 46. For instance, the metadata schema 46 may define facts, dimensions, and other aspects of the star schema database 60. As discussed before, metadata schema 46 may be user-defined. This may allow a user to define, for example, the names of tables, columns, and attributes within star schema database 60.

At step 206, star schema database is generated. Star schema database 60 may be any database conforming to the star schema style of data warehouse schema. Although the generation of star schema database 60 is depicted as a separate step in the illustrated embodiment, the star schema database 60 may also be generated in approximately real time at the same time that the data is aggregated into star schema objects. Regardless of when it is generated, star schema database 60 may also be generated using metadata schema 46.

In the illustrated embodiment, only one star schema database 60 is pictured. In alternative embodiments, multiple star schema databases may be generated and used. According to particular embodiments, star schema database 60 may be used for filtering and aggregation purposes for multiple users or clients. Alternatively, a single star schema database 60 may be used for only one user or computer system 12. In these particular embodiments, star schema database 60 may be located in storage device 32, as pictured, or may alternatively be located on client system 10, for instance in computer system 12.

After data has been aggregated into star schema objects and star schema database 60 has been generated, the objects are then stored in star schema database 60, according to step 208. In particular embodiments, the users may then consult star schema database for star schema objects or statistics stored within. This may be accomplished using computer system 12 and computer application 14.

According to particular embodiments, user reports may be generated based on the data stored within star schema database 60. The types of data included in these reports may vary depending on the application used. For example, when running a project management application, a incoming data may relate to event notification and corresponding measurements. In these particular embodiments, the reports may convey information about these measurements or metrics, including but not limited to count, average, minimum, maximum, and standard deviation. The reports may vary depending on the types of data to be received and the amount of detail a user wishes to receive.

The actual reports may come in many different forms. These formats may include, but are not limited to database table entries, pop-up messages, e-mails, instant messages, or any other document, electronic communication, or combination thereof. In particular embodiments, the report may simply be stored, for example in database tables 48, star schema database 60, or on a user's computer system 12. In these situations, a user may have to access the storage medium to find the report. In alternative embodiments, a report may be affirmatively communicated to a user. This may be accomplished by sending it to a client system 10 and displaying the alert on computer system 12, possibly using computer application 14.

It should be understood that some of the steps illustrated in FIG. 2 may be combined, modified, or deleted where appropriate, and additional steps may also be added to the flow diagram.

In addition to the advantages enumerated above, various embodiments of the present disclosure provide other benefits. In general, the aggregation method of the present disclosure may allow for aggregation of data into a star schema database based on a user-defined metadata schema. In particular embodiments, this may allow for more customizable and scalable method of aggregating raw data. Additionally, the method may provide for the generation and delivery of user reports based on the aggregated data. Various other advantages may be readily apparent to one having skill in the art.

Although the present invention has been described in detail, it should be understood that various changes, substitutions, and alterations can be made without departing from the spirit and scope of the invention as defined by the appended claims.

What is claimed is:

1. A method, comprising:
   receiving data from a first data source;
   converting the data into data packets having a common format using a user-defined metadata schema;
   filtering the data packets using the user-defined metadata schema, wherein filtering the data packets includes:
      replacing data in a first portion of the data packets with data from database tables of a second data source; and
      storing a second portion of the data packets in a third data source;
   aggregating the first portion of the data packets into star schema objects, based on the user-defined metadata schema;
   storing the star schema objects into a star schema database; and
   wherein the metadata schema defines how the data is converted into data packets, filtering criteria, and the star schema objects.

2. The method of claim 1, wherein the star schema database is generated in approximately real time using the user-defined metadata schema.

3. The method of claim 1, wherein the star schema objects comprise statistics relating to the data.

4. The method of claim 3, further comprising generating reports based on the statistics.

5. The method of claim 4, further comprising communicating the reports to a user.

6. The method of claim 1, wherein filtering the data packets further includes deleting data packets based on one or more thresholds defined in the user-defined metadata schema.

7. A system, comprising:
   an interface being operable to receive data from a first data source;
   a processor being operable to:
      convert the data into data packets having a common format using a user-defined metadata schema;
      filter the data packets using the user-defined metadata schema, wherein filtering the data packets includes:
         replacing data in a first portion of the data packets with data from database tables of a second data source; and
         storing a second portion of the data packets in a third data source;
      aggregate the filtered first portion of the data packets into star schema objects, based on the user-defined metadata schema;

a star schema database operable to store the star schema objects; and wherein the metadata schema defines how the data is converted into data packets, filtering criteria, and the star schema objects.

8. The system of claim 7, wherein the star schema database is generated in approximately real time using the user-defined metadata schema.

9. The system of claim 7, wherein the star schema objects comprise statistics relating to the data.

10. The system of claim 9, wherein the processor is further operable to generate reports based on the statistics.

11. The system of claim 10, wherein the interface is further operable to communicate the reports to a user.

12. The system of The method of claim 7, wherein the processor operable to filter the data packets is further operable to delete data packets based on one or more thresholds defined in the user-defined metadata schema.

13. A non-transitory, computer readable medium comprising logic operable, when executed on a processor, to:
receive data from a first data source;
convert the data into data packets having a common format using a user-defined metadata schema;
filter the data packets using the user-defined metadata schema, wherein filtering the data packets includes:
replacing data in a first portion of the data packets with data from database tables of a second data source; and
storing a second portion of the data packets in a third data source;
aggregate the first portion of the data packets into star schema objects, based on the user-defined metadata schema;
store the star schema objects into a star schema database; and
wherein the metadata schema defines how the data is converted into data packets, filtering criteria, and the star schema objects.

14. The computer readable medium of claim 13, wherein the star schema database is generated in approximately real time using the user-defined metadata schema.

15. The computer readable medium of claim 13, wherein the star schema objects comprise statistics relating to the data.

16. The computer readable medium of claim 15, wherein the logic is further operable to generate reports based on the statistics.

17. The computer readable medium of claim 16, wherein the logic is further operable to communicate the reports to a user.

18. The computer readable medium of claim 13, wherein the logic operable to filter the data packets is further operable to delete data packets based on one or more thresholds defined in the user-defined metadata schema.

* * * * *